(12) United States Patent
Tsuda et al.

(10) Patent No.: US 7,401,127 B2
(45) Date of Patent: Jul. 15, 2008

(54) COMMUNICATION TERMINAL DEVICE AND PROGRAM

(75) Inventors: Masayuki Tsuda, Tokyo (JP); Mao Asai, Yokosuka (JP); Nobuyuki Watanabe, Sayama (JP); Tatsuro Oi, Kawasaki (JP); Yasunori Hattori, Fujisawa (JP); Masakazu Nishida, Yokosuka (JP); Naoki Naruse, Yokohama (JP); Yuichi Ichikawa, Yokosuka (JP); Atsuki Tomioka, Yokohama (JP); Masato Takeshita, Mitaka (JP); Kazuhiro Yamada, Yokohama (JP); Satoshi Washio, Tokyo (JP); Dai Kamiya, Tokyo (JP); Naoki Yamane, Tokyo (JP); Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 778 days.

(21) Appl. No.: 10/811,060

(22) Filed: Mar. 26, 2004

(65) Prior Publication Data

US 2005/0021693 A1    Jan. 27, 2005

(30) Foreign Application Priority Data

Mar. 28, 2003  (JP) ............................. 2003-091295

(51) Int. Cl.
*G06F 15/173* (2006.01)

(52) U.S. Cl. .................................................... 709/217

(58) Field of Classification Search ................. 709/217, 709/220, 223
See application file for complete search history.

(56) References Cited

U.S. PATENT DOCUMENTS

| 5,586,304 | A | * | 12/1996 | Stupek et al. | ............... 717/170 |
| 5,588,143 | A | * | 12/1996 | Stupek et al. | ................ 703/20 |
| 5,802,162 | A | * | 9/1998 | Beltrano et al. | ............. 379/242 |
| 5,809,287 | A | * | 9/1998 | Stupek et al. | ................ 703/22 |
| 5,960,189 | A | * | 9/1999 | Stupek et al. | ............... 717/169 |
| 6,101,505 | A | * | 8/2000 | Sun | ........................... 707/203 |
| 6,275,694 | B1 | | 8/2001 | Yoshida et al. | |
| 6,360,363 | B1 | * | 3/2002 | Moser et al. | ................ 717/170 |
| 6,378,069 | B1 | | 4/2002 | Sandler et al. | |
| 6,418,555 | B2 | * | 7/2002 | Mohammed | ................ 717/169 |

FOREIGN PATENT DOCUMENTS

| DE | 195 43 843 A1 | 5/1997 |
| EP | 1 289 324 A1 | 3/2003 |
| GB | 2 357 865 A | 7/2001 |
| JP | 2000-218089 | 8/2000 |
| JP | 2000-311143 | 11/2000 |

(Continued)

OTHER PUBLICATIONS

JSR 118 Expert Group, "Mobile Information Device Profile", *Java Community Process*, v.2.0 (JSR-118), Nov. 5, 2002, XP002311394.

(Continued)

*Primary Examiner*—David Y Eng
(74) *Attorney, Agent, or Firm*—Brinks Hofer Gilson & Lione

(57) ABSTRACT

Specific commands are contained in an application program executed in a communication terminal device, and when those commands are executed, operation of the application program is suspended by the communication terminal device and the application program is upgraded.

22 Claims, 7 Drawing Sheets

FOREIGN PATENT DOCUMENTS

| | | |
|---|---|---|
| JP | 2001-53882 A | 2/2001 |
| JP | 2001-318795 | 11/2001 |

OTHER PUBLICATIONS

Hicks, M. et al., "Dynamic Software Updating", *Association for Computing Machinery*, vol. 36, No. 5, May 2001.

European Examination Report, EP App. No. 04 007 536.8, Sep. 25, 2006.

Office Action from the Japanese Patent Office in the corresponding Japanese patent application dated Nov. 12, 2007, (with full translation) (Five (5) pgs.).

Office Action from the Japanese Patent Office in the corresponding Japanese patent application dated Mar. 18, 2008, (with full translation) (Six (6) pgs.).

* cited by examiner

| No. | PROGRAM | DATE AND TIME THAT A PROGRAM IS ACQUIRED |
|---|---|---|
| 1 | JavaAPP | 2002.11.01 |
| ⋮ | ⋮ | ⋮ |
| 30 | ... | ... |
| 31 | ... | ... |

//

COMMUNICATION TERMINAL DEVICE AND PROGRAM

This application claims priority under 35 U.S.C. §119 to Japanese Patent Application No. 2003-091295 filed Mar. 28, 2003, the entire content of which is hereby incorporated by reference.

TECHNICAL FIELD

The present invention relates to techniques for upgrading an application program stored in a communication terminal device.

BACKGROUND ART

There is known in the art a communication terminal device such as a mobile phone that is capable of executing an application program for implementing various applications such as games, schedules and the like. A user of this type of communication terminal device is thereby able to download and use desired application programs from a content provider connected to the Internet.

A Content Provider providing this type of application program (hereafter referred to as a "CP") also provides new application programs to upgrade previously provided application programs so as to correct deficiencies or provide new functions, and the like, relative to the pre-existing program. In the following description, an application program that performs correction of deficiencies, addition of new functions and the like will be referred to as "a new application program", while a previously provided application program will be referred to as "a pre-existing application program". When a user using a pre-existing application program wants to use a new application program, it is necessary to download this new application program, and overwrite the preexisting application program stored in the communication terminal device with the new application program. In the following description, downloading a new application program and overwriting the pre-existing application program with the new application program is referred to as "upgrading".

However, downloading and upgrading application programs is inconvenient for users every time a new application program is provided, because each users needs to inquire a CP regularly whether a new application program is provided for that not all users may be aware of when a new application program is provided.

There are known in the art different techniques for overcoming the problem described above. One is disclosed, for example, in Japanese patent laid-open No. 2001-53882. By the technique of the above patent when a new application program is provided for a communication terminal device, the preexisting program in the device is automatically overwritten from the CP side to provide an updated application program in the device.

However, a problem exists with this technique at both the user and CP side in that applications that are no longer in use at the user side may nonetheless be automatically overwritten and updated from the CP side. This results in an unnecessary increase in load on the CP server, which increases proportionate to a number of application programs, required to be updated, stored in communication terminal devices.

To overcome the problem stated above, one solution is for the CP to request a user whether they wish to receive a particular upgrade. However, this solution results in inconvenience to the users since s/he is required to repeatedly respond to such inquiries, regardless of whether a program to be upgraded is actually used by the user.

DISCLOSURE OF THE INVENTION

In view of the foregoing, it is an object of the present invention to provide a technique for enabling upgrade of only such application programs as are actually used by a user.

In order to solve the above-described problems, the present invention provides a communication terminal device comprising: communication means for communicating with a provider of an application program via a communication network; execution means for executing an application program, and for executing specified commands contained in said application program; suspend means for suspending operation of said executed application program when said specified commands are executed by said execution means; and upgrade means for upgrading said application program by communicating, by said communication means, with said provider of an application program whose operation is suspended by said suspend means.

According to the communication terminal device of the present invention, when specified commands contained in an application program are executed during operation of the application program in the communication terminal device, operation of the application program is suspended and the application program is upgraded. Accordingly, the present invention enables at a user side only such programs which are actually used by the user to be upgraded.

Also, in order to solve the above described problems, the present invention provides: a program for causing a computer to execute communication means for communicating with a provider of an application program via a communication network; execution means for executing an application program containing specified commands; suspend means for suspending operation of said application program when said specified commands are executed by said execution means; and upgrade means for upgrading said application program by communicating, by said communication means, with said provider of an application program whose operation is suspended by said suspend means.

According to the present invention, when an upgrade method contained in an application program is executed during operation of the application program, operation of the application program is suspended and the application program is upgraded.

DETAILED DESCRIPTION OF THE PREFERRED EMBODIMENTS

Figure 1:
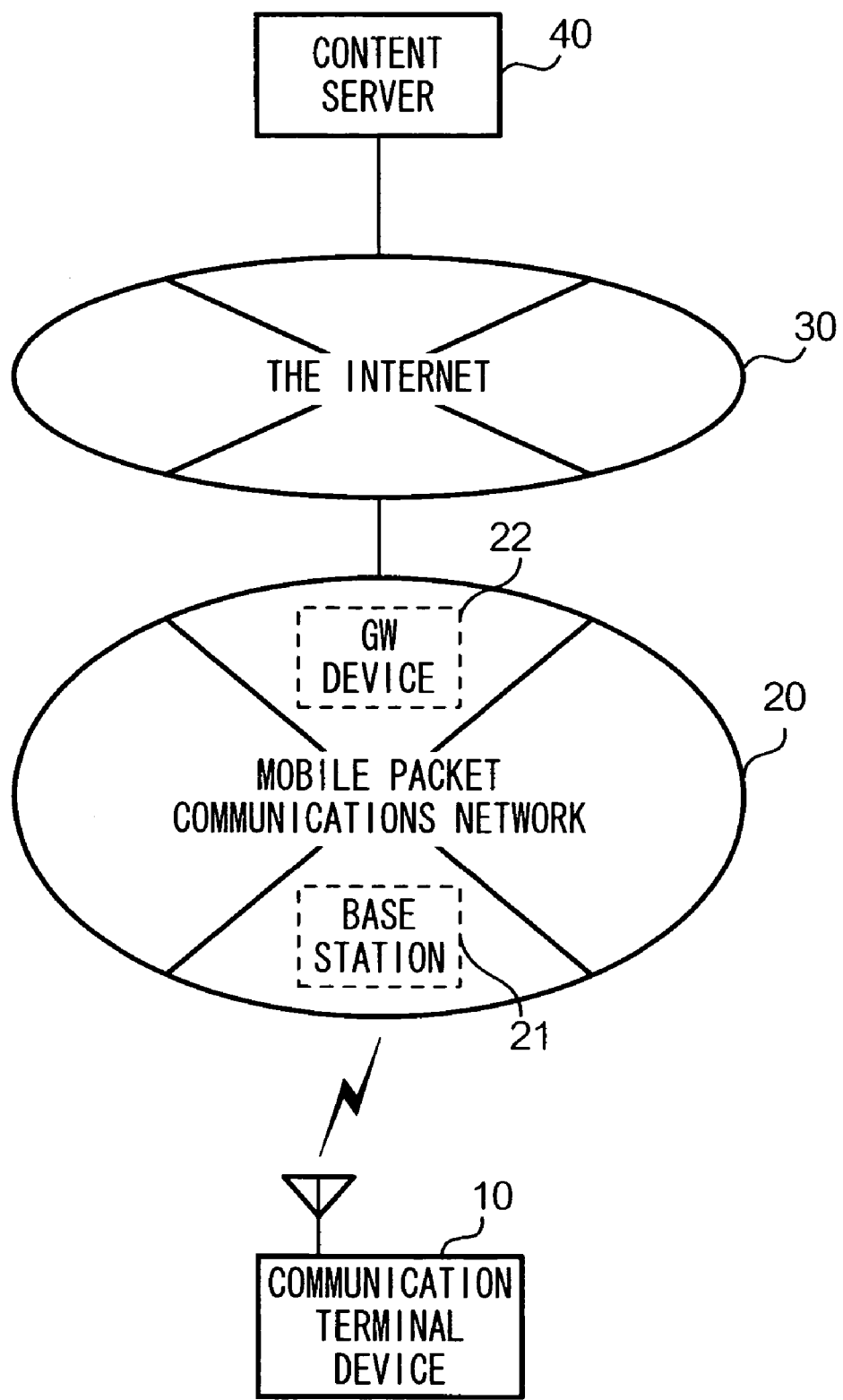
FIG. 1 is a drawing showing an example structure of a communication system having a communication terminal device 10 of the present invention.

Embodiments of the present invention will now be described with reference to the drawings A. Structure 1: Structure of a Communication System FIG. 1 is a drawing showing one example of the overall structure of a communication system having a communication terminal device 10 of the embodiment. A content server 40 shown in FIG. 1 has the same structure as a general computer, and is connected to the Internet 30. The content server 40 stores an application program, to be provided to the communication terminal device 10, the application program correlating with data (hereafter called "provision date data") indicating the date when provision of the application program is started. The application program is written in Java®, an object-oriented programming language (hereafter referred to as a Java APP). The Java APP is comprised of Java bytecode that can be interpreted and executed in a Java Runtime environment, which will be described later.

A mobile packet communication network 20 provides packet communication services for a communication terminal device 10 located in the mobile packet communication network 20. The mobile communication network 20 has a base station 21 and a gateway (hereafter referred to as "GW") device 22. There is a plurality of base stations 21 provided within the service area of the mobile packet communication network 20. The base station 21 forms a wireless cell having a fixed range (for example, a range of a 500 meter radius from the center of the base station 21), and carries out wireless communication with a communication terminal device 10 within the range of the wireless cell. The GW device 22 converts (interprets) a communication protocol between the mobile packet communication network 20 and the Internet 30, to act as an interface there between.

The communication terminal device 10 is a mobile telephone having a Java Runtime environment. The communication terminal device 10 can download a Java APP from the content server 40 via a mobile packet communication network 20 and the Internet 30, and can store a predetermined number of Java APPs (for example, thirty Java APPs). More especially, a Java APP for implementing a clock function is stored in the communication terminal device 10. Specifically, by executing the Java APP, the communication terminal device 10 carries out operations in accordance with the flowchart shown in FIG. 2, and displays the screen shown in FIG. 3 on the display unit. The Java APP has an upgrade method containing commands for upgrading the Java APP. When the upgrade method is invoked and the commands are executed, upgrade of the Java APP is carried out. The Java APP stored in the communication terminal device 10 is not limited to implementation of a clock function, and obviously can also be a Java APP for implementing a game function, scheduler function, and the like.

2: Structure of the Communication Terminal Device 10

Figure 4:
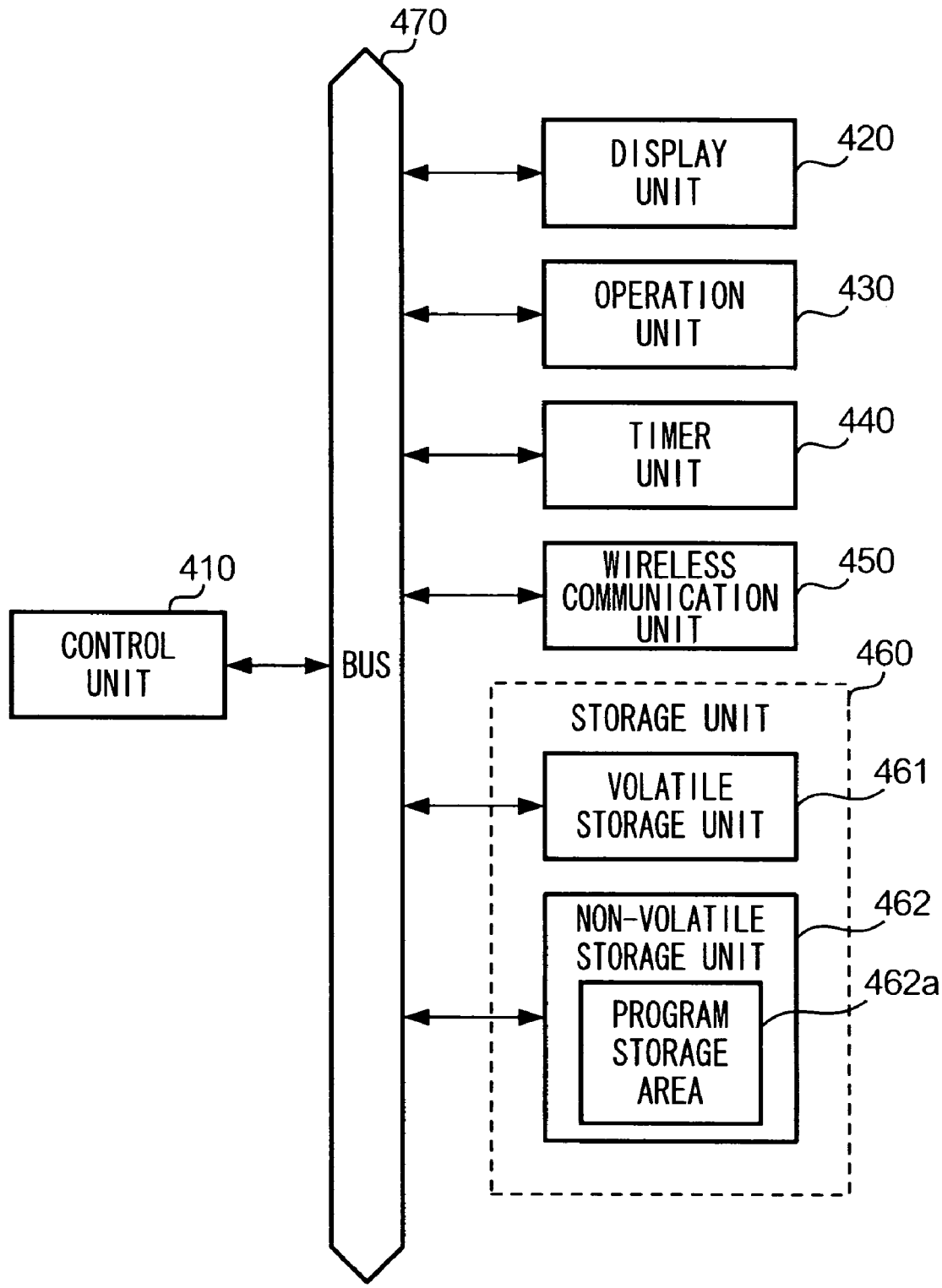
FIG. 4 is a drawing showing an example of the structure of the communication terminal device 10.

Next, the hardware structure of the communication terminal device 10 will be described with reference to FIG. 4. As shown in FIG. 4, the communication terminal device 10 comprises: a control unit 410; a display unit 420; an operating unit 430; a timer unit 440; a wireless communication unit 450; a storage unit 460; and a bus 470, which mediates data transfer among each element.

The control unit 410 comprises, for example, a CPU (central processing unit) for example, and controls each unit of the communication terminal device 10 by executing software stored in the storage unit 460. The display unit 420 comprises, for example, a liquid crystal display, and a drive circuit for the liquid crystal display, and displays images corresponding to image data delivered from the control unit 410. The operating unit 430 is provided with a plurality of operating elements to allow a user to input numbers, characters, operating instructions and so on, and delivers to the control unit 410, data corresponding to the operation details of these operating elements. The timer unit 440 is provided with a timer function, and provides current date data representing the current date to the control unit 410.

The wireless communication unit 450 is provided with an antenna, not shown in the drawing, and performs wireless communication with base stations 21 constituting a wireless cell in which the communication terminal device 10 is stored. The wireless communication cell 450 receives data transmitted from a base station 21, and delivers the received data to the control unit 410. The wireless communication cell 450 also transmits data delivered from the control unit 410 to the base station 21.

The storage unit 460 has a volatile storage unit 461 and a nonvolatile storage unit 462. The volatile storage unit 461 is RAM (Random Access Memory), for example, and is used as a work area by the control unit 410 during operation of software. The nonvolatile storage unit 462 is, for example, EEPROM (Electrically Erasable Programmable Read Only Memory), and has a program storage area 462a for storing Java APPs that have been downloaded from the content server 40. The nonvolatile storage unit 462 stores OS software for implementing an operating system (hereafter referred to as "OS"), and software for building a Java Runtime environment, in addition to the above Java APPs. Also, a threshold value is stored in the nonvolatile storage unit 462, the threshold value being used for enabling the control unit 410 to determine whether communication with the base station 21 is possible. The control unit 410 determines whether communication with the content server 40 is possible via the base station 21 by comparing the threshold value with a value indicating radio field intensity received from the base station 21 via the wireless communication unit 450.

Figures 3, 5:
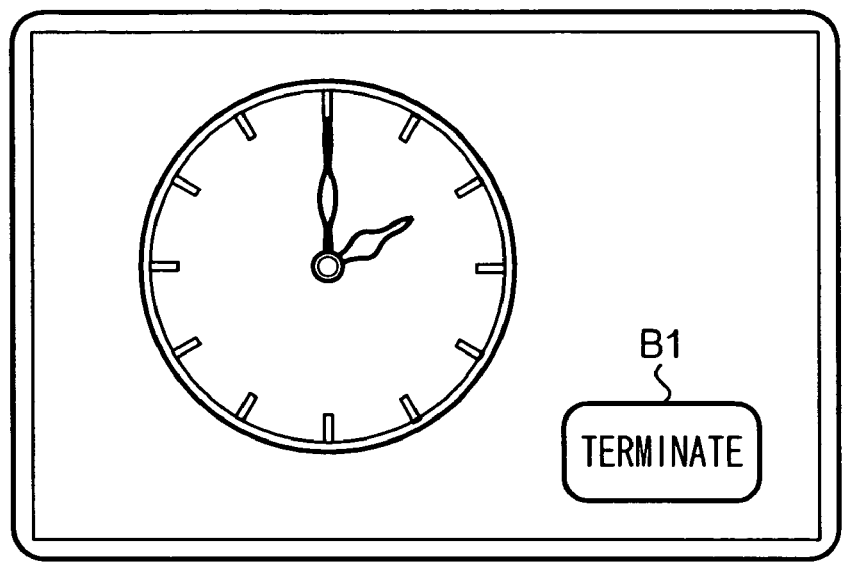
FIG. 3 is a drawing showing an example of a display screen displayed on a display unit 420 of the communication terminal device 10.
FIG. 5 is a drawing showing one example of a program storage area 462a of the communication terminal device 10.

First of all, the program storage unit 462a will be described with reference to FIG. 5. As shown in FIG. 5, the program storage area 462a contains 31 areas for storing a JAR (Java Archive) file contained in the Java APP, and data indicating the date and time when the JAR file was downloaded (hereafter referred to a "download date data"), which correspond with each other. A JAR file is a file compiling a body program of the Java APP (a program written in Java bytecode), together with image files containing image data and audio files containing audio data to be used when the program is executed, both of which are referred to as a "resource". While 30 Java APPs can be stored in the communication terminal device 10, the reason for that 31 areas are provided in the program storage area 462a so that the 31st region is used as a work area when the Java APP is upgraded. In the following description, this 31st area is referred to as a "reserved area".

Figure 6:
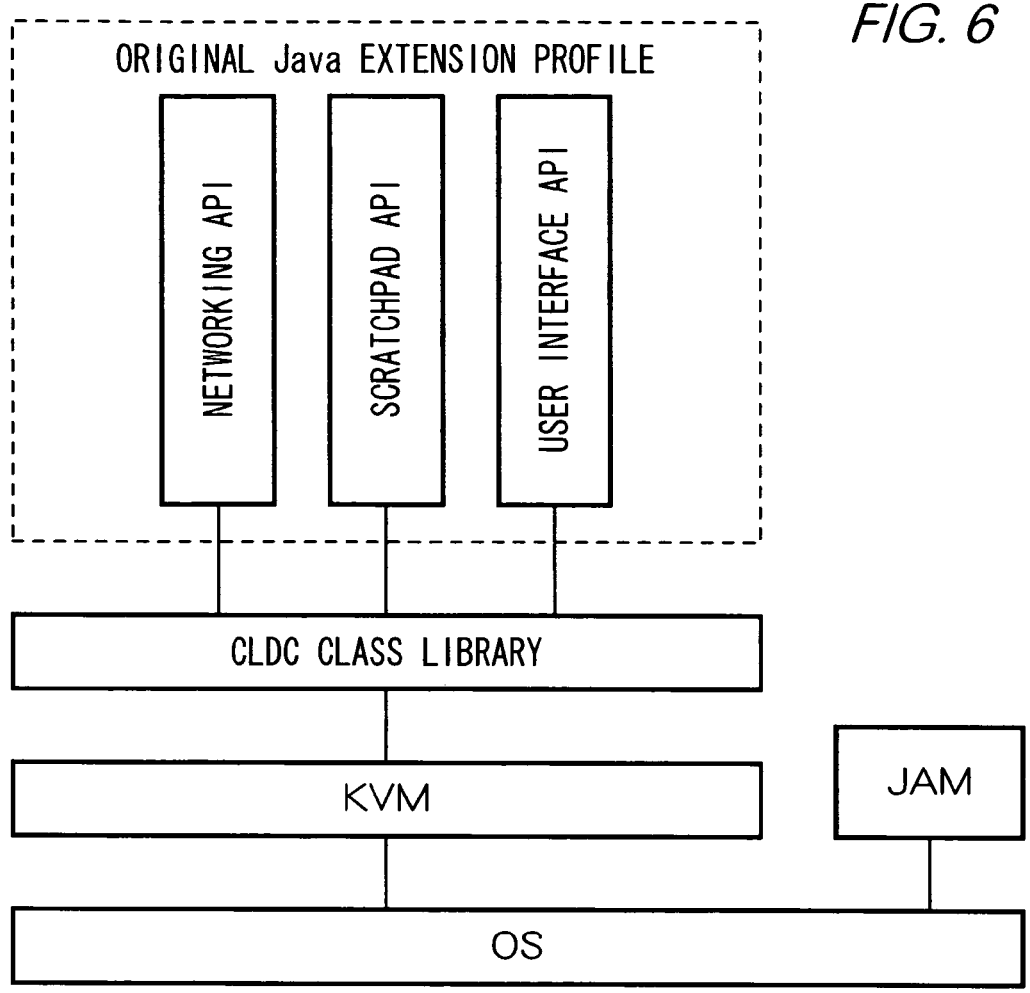
FIG. 6 is a drawing describing a Java Runtime environment built in to the communication terminal device 10.
Figure 9:
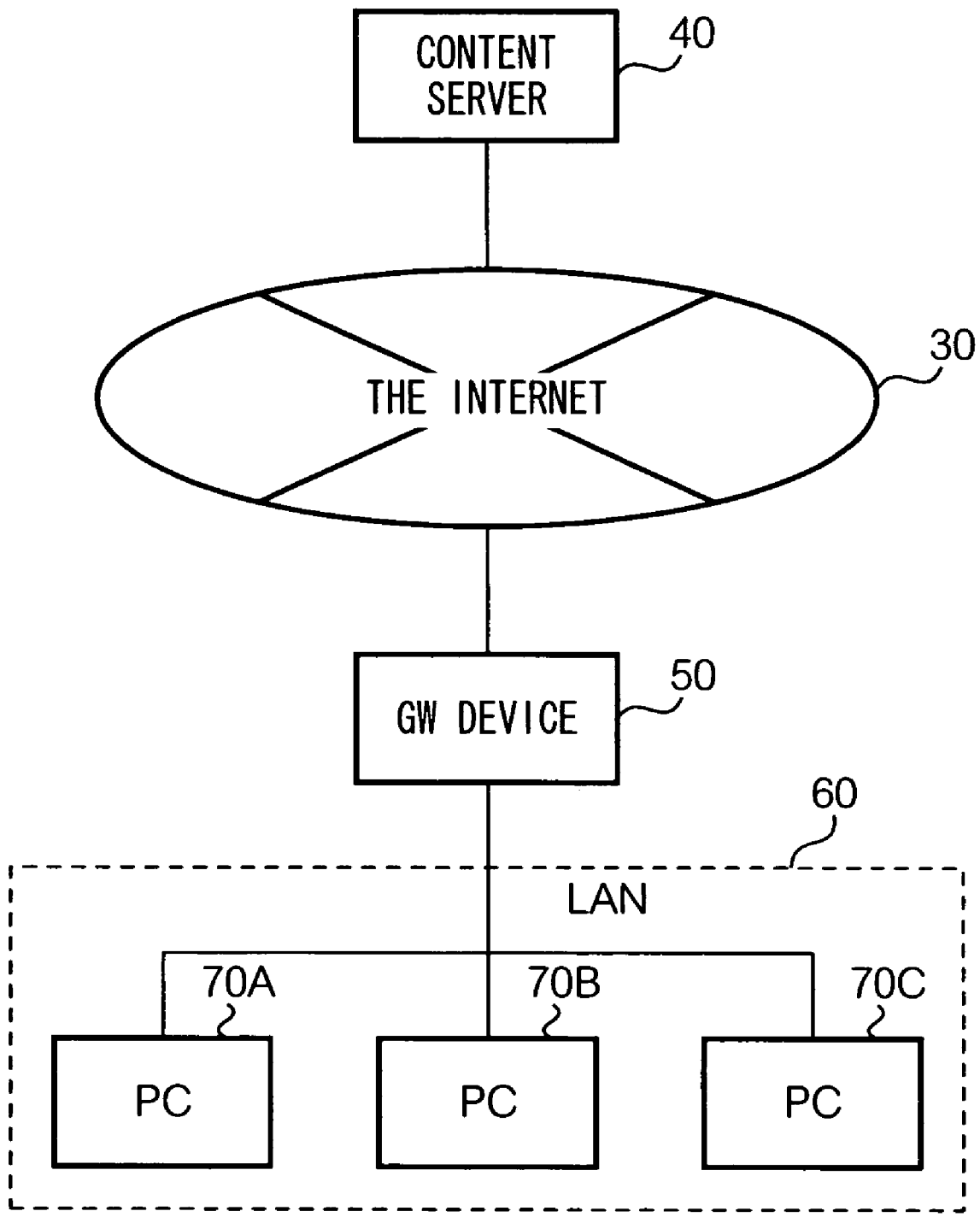
FIG. 9 is a drawing showing an example structure of a communication system of modification 2.

Next, software built into the communication terminal device 10 for building a Java Runtime environment will be described with reference to FIG. 6. As stated, FIG. 6 is a drawing describing a Java Runtime environment in the communication terminal device 10. As shown in FIG. 9, software for implementing a Java Runtime environment conforming to J2ME (Java 2 platform Micro Edition) is incorporated into the communication terminal device 10. Here, J2ME is a Java Runtime environment standard directed to small electronic devices. KVM, CLDC (Connected Limited Device Configuration) class libraries, original Java extension profiles, and JAM (Java Application Manager) are included in the software incorporated into this communication terminal device. In this embodiment, description is given of a case where the present invention is applied to a communication terminal device 10 having a Java Runtime environment conforming to J2ME. Needless to say, the present invention is also applicable for use with a communication terminal device having a Java Runtime environment based on J2SE (Java2 Standard Edition) or J2EE (Java2 Enterprise Edition). J2SE is a Java Runtime environment standard directed to personal computer devices (hereafter referred to as "PC"), while J2EE is a Java Runtime environment standard directed to server devices such as the content server 40, for example.

KVM is a type of JVM, and is designed for use with small electronic devices such as mobile phones and PDAs (Personal Digital Assistance). JVM converts Java bytecode constituting a Java APP to a machine code capable of being interpreted by the control unit 410, to thereby enable the control unit 410 to execute the converted machine code. Also, the CLDC class library is a class library for providing multi purpose functions directed to small electronic devices such as mobile phones and PDAs.

The original Java extension profiles are class libraries for providing functions specialized for use with mobile phones, and are based on the CLDC class library. For example, a user interface API (Application Program Interface), a networking API, and a scratchpad API, and the like are included in these original Java extension profiles. The control unit 410 for executing a Java APP is able to use functions provided by these APIs by calling the APIs in accordance with Java bytecode constituting the Java APP.

The user interface API is an API for supporting a user interface function of the communication terminal device 10. The networking API is an API for accessing a network resource specified by a URL (Uniform Resource Locator). The scratchpad API is an API for supporting reading and writing to and from a scratchpad. The scratchpad (not shown in the figure) is a storage area provided in the nonvolatile storage area 462. Data generated in response to execution of the Java APP is stored in the scratchpad. The communication terminal device 10 has maker unique extension libraries as well as the CLDC class libraries and the original Java extension profiles described above. This maker unique extension library is a class library for a manufacturer of the communication terminal device 10 for providing respective unique functions.

JAM is software under the control of the OS for carrying out management of Java APPs stored in the communication terminal device 10. Specifically, in order to carry out Java APP management, the control unit 410 implements a function for installing, upgrading or deleting Java APPs in accordance with JAM, a function for displaying names of Java APPs stored in the program storage section 462*a* in a list, and a function for carrying out execution management for Java APPs. A function for installing a Java APP is a function for writing a Java APP that is downloaded from the content server 40 to the program storage area 462*a*. A function for upgrading a Java APP is a function for downloading a new Java APP from the content server 40, and overwriting a pre-existing Java APP stored in the program storage area 462*a* with this new Java APP.

The function for carrying out execution management of Java APPs is a function for carrying out launch and termination of Java APP execution. Described in more detail, if Java APP execution is directed by the user, first of all, the control unit 410 secures a work area for execution of the Java APP in the volatile storage unit 461 in accordance with JAM. Data developed by the Java bytecode constituting the Java APP the user has instructed to run, and data input by the user during operation of the Java APP are stored in this work area. Next, the storage unit 410 expands the Java bytecode constituting the Java APP into the work area secured inside the volatile storage section 461, and then interprets and executes the Java bytecode in accordance with KVM. If the user then instructs termination of the Java APP, the control unit 410 terminates interpretation and execution of the Java bytecode using KVM, opens the work area secured in the volatile storage unit 461 for execution of the Java APP, and terminates operation of the Java APP.

Also, the control unit 410 can suspend Java APP operation and resume operation of a suspended Java APP in accordance with JAM. Suspending the operation of the Java APP means that interpretation and operation of the Java bytecode constituting the Java APP are suspended with the Java bytecode being stored in the volatile storage unit 461. In this way, when operation of a Java APP is suspended, opening of the work area secured for operation of the Java APP is not carried out. As a result, data, input by the user, before the suspension of operative Java APP is retained. Further, resuming the operation of a suspended Java APP means that interpretation and execution of the Java bytecode constituting the Java APP are resumed from the point where interpretation and execution of the Java bytecode, constituting the Java APP, were suspended.

B. Operation

Figure 7:
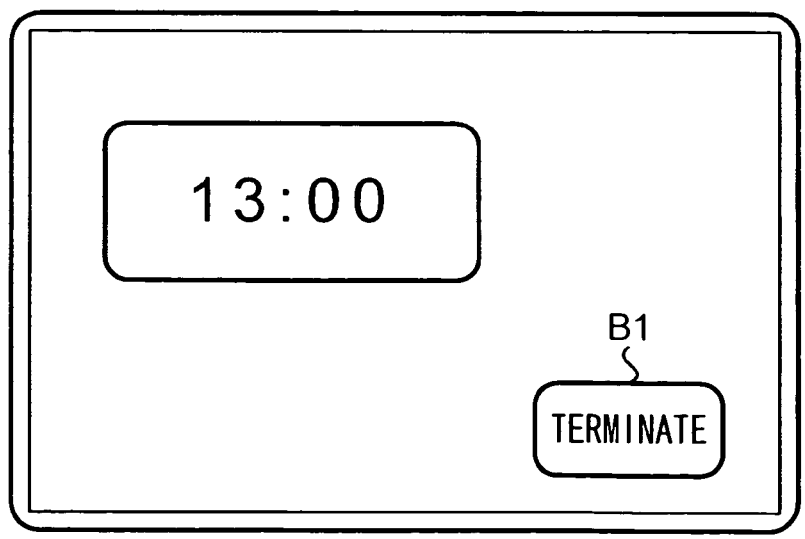
FIG. 7 is a drawing showing an example of a display screen displayed on a display unit 420 of the communication terminal device 10.

Next, with regard to the operations carried out by the control unit 410 of the communication terminal device 10 in the embodiment, the description will be given of operations highlighting the features of this communication terminal device. It is assumed that the operational example is described as the following: a Java APP stored in the communication terminal device 10 was downloaded on Nov. 1, 2002 (refer to FIG. 5.) For this Java APP, provision of a new Java APP, corrected so as to display the screen shown in FIG. 7 instead of the screen shown in FIG. 3, was started from Nov. 20, 2002, using a CP managing the content server 40. In the following description, the Java APP displaying the display screen shown in FIG. 2 (that is to say, the Java APP stored in the communication terminal device 10) is called a "pre-existing Java APP", and the Java APP displaying the screen shown in FIG. 7 is called a "new Java APP". It is assumed that the user of the communication terminal device 10 executed the above-described pre-existing Java APP on Nov. 21, 2002.

Figure 2:
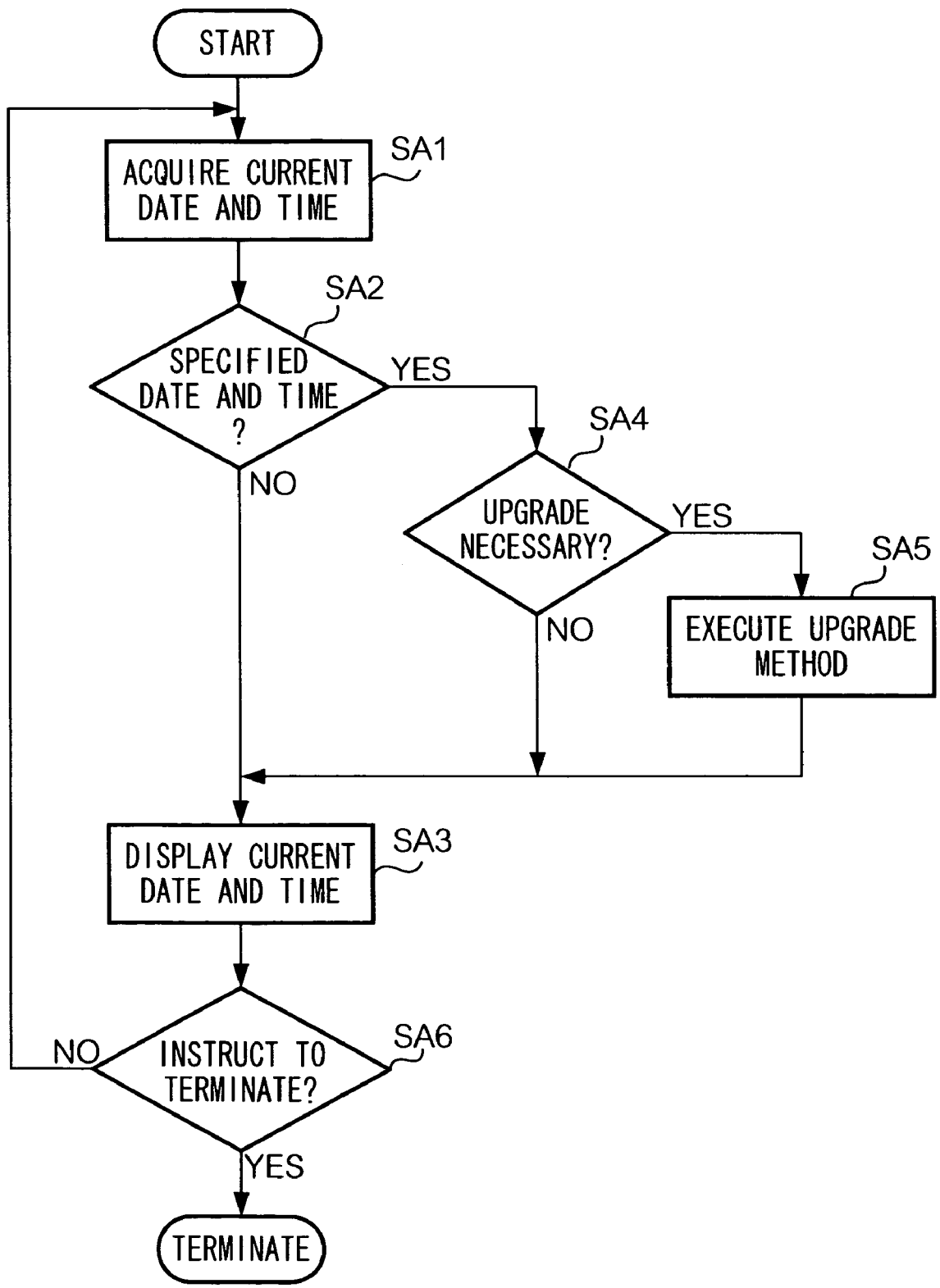
FIG. 2 is a flowchart describing a series of operations carried out by a control unit 410 of the communication terminal device in accordance with a Java-AP.

1: Operation Carried Out by the Control Unit 410 in Accordance With the Java APP First of all, description will be given with reference to FIG. 2 about an operation carried out by the control unit 410 in accordance with the pre-existing Java APP As shown in FIG. 2, the control unit 410 first of all acquires current data and time data from the timer unit 440 (step SA1), and determines whether the data and time represented by the current date data is specified date and time (step SA2).

If the determination result of step SA2 is "NO", the control unit 410 displays the screen shown in FIG. 3 on the display unit 420 based on data acquired in step SA1 (step SA3), and proceeds to the processing of step SA6. On the other hand, if the determination result of step SA2 is "YES", the control unit 410 determines whether the pre-existing Java APP needs to be upgraded (step SA4). Specifically, the control unit 410 acquires "provision date data" for the Java APP from the content server 40, and compares it with "download date data" stored in the program storage area 462a. Then, if the former (provision date data) represents a later date than the latter (download date data), it is determined that an upgrade is required; while if the former represents an earlier date than the latter, it is determined that the upgrade is not required.

If the determination result of step SA4 is "YES", the control unit 410 executes the upgrade method provided by the Java APP (step SA5). Operation of the control unit 410 after the upgrade method is commenced will be described later. On the other hand, if the determination result in step SA4 is "NO", the control unit 410 carries out processing of the above-described step SA3. In this operation example, since the former represents "Nov. 20, 2002" and the latter represents "Nov. 1, 2002", the control unit 410 determines in step SA4 that "upgrade is required".

In step SA6 proceeding from step SA3, the control unit 410 determines whether termination of operation of the pre-existing Java APP has been instructed by the user. If the result of determination in step SA6 is "YES", the control unit 410 terminates operation of the pre-existing Java APP. On the other hand, if the determination result in step SA6 is "NO" the control unit 410 reexecutes of the processes from the above described step SA1.

In this embodiment, the description is given for the case where the control unit 410 during operation of the pre-existing Java APP periodically determines whether upgrade of that pre-existing Java APP is required, and executes an upgrade method only if it is determined that upgrade of the Java APP is required. However, the opportunity for the control unit 410 to execute the upgrade method is not limited to the above case. For example, during operation of the Java APP a communication message can be transmitted from the content server 40, and it is also possible to cause the control unit 410 to run the upgrade method only when a communication message instructing that upgrade of the Java APP is possible is received.

2: Operation of the Control Unit 410 When the Upgrade Method is Executed

Figure 8:
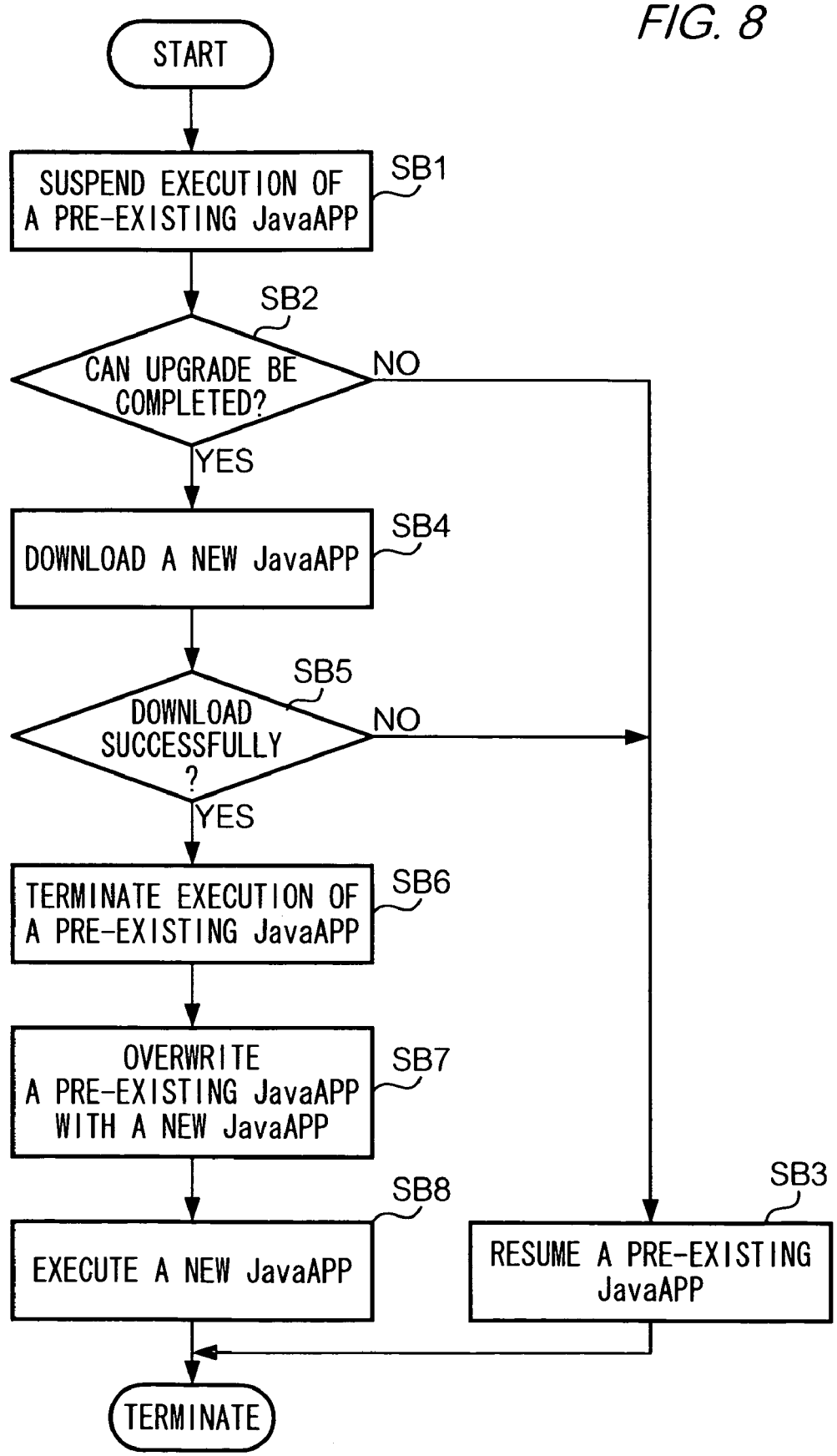
FIG. 8 is a flowchart describing a series of operations carried out by the control unit 410 in accordance with JAM when an upgrade method is called.

Next, description will given with reference to FIG. 8 about operations carried out by the control unit 410 in accordance with JAM when the above-described upgrade method is executed. As stated, FIG. 8 is a flowchart showing a series of operations carried out by the control unit 410 in accordance with JAM when the upgrade method is executed As shown in FIG. 8, the control unit 410 first of all suspends operation of the pre-existing Java APP (step SB1), and then determines whether upgrade of the pre-existing Java APP can be completed (step SB2). Specifically, the control unit 410 detects radio field intensity of wireless communication with the base station 21, compares a value for the detected radio field intensity with a threshold value stored in the nonvolatile storage unit 462, and if the former (value for the detected radio field intensity) is larger than the latter (a threshold value stored in the nonvolatile storage unit 462), it is determined that upgrade of the Java APP can be completed, while if the former is smaller than the latter it is determined that the upgrade of the Java APP can not be completed.

If the determination result in step SB2 is "NO", the control unit 410 resumes operation of the Java APP that was suspended in step SB1 (step SB3), and completes the upgrade operation. On the other hand, if the determination result of step SB2 is "YES", the control unit 410 downloads the new Java APP from the content server 40, and stores the downloaded new Java APP in the reserved area (step SB4). The reason, that the new Java APP is not downloaded if the radio field intensity transmitted from the base station 21 is less than a specified threshold value, is that wireless communication become impossible during the download of the new Java APP, and the download of the new Java APP may fail. In the following description, an operation example will be described in which a radio field intensity between the communication terminal device 10 and the base station 21 is greater than a specified threshold value. That is to say, the process of step SB4 described above is carried out. In this embodiment, description is given for a case where a new Java APP is downloaded instantly if the determination result of step SB2 is "YES". However, obviously it is also possible for a user to confirm whether to carry out the download of the new Java APP, and to carry out step SB4 only if the user instructs to carry out the download of the new Java APP.

In step SB5 proceeding from step SB4, the control unit 410 determines whether download of the new Java APP is completed successfully. If the determination result in step SB5 is "YES", the control unit 410 terminates operation of the pre-existing Java APP that was suspended in step SB1 (step SB6), and overwrites the pre-existing Java APP with the new Java APP. On the other hand, if the determination result in step SB5 is "NO", the process of the above described step SB3 is carried out, and the upgrade operation is completed. The reason, that the Java APP is overwritten with the new Java APP only if the download of the new Java APP is completed successfully, is that if the Java AP is overwritten although the download of the new Java APP is not completed successfully, there is a danger that the new Java APP may not be executed successfully. The cases, that download of the new Java APP is not completed successfully, are that download of the new Java APP is stopped by the user, or communication with the base station 21 becomes impossible during the download of the new Java APP. In the following, the description will only be given about this operational example that download of the new Java APP is completed successfully.

In step SB7 proceeding from step SB6, the control unit 410 overwrites the pre-existing Java APP stored in the program storage area 462a with the new Java APP stored in the reserved area in step SB4 (step SB7), and executes the new Java APP (step SB8). By executing the upgraded new Java APP in this way, the display screen shown in FIG. 7 is displayed on the display unit 220 of the communication terminal device 10.

As described above, in this embodiment, the communication terminal device 10 can upgrade a pre-existing Java APP to a new Java APP during the operation of the pre-existing Java APP by using an upgrade method. In this way, the upgrade is carried out only to Java APP to be actually used by the user.

It is therefore intended that the foregoing detailed description be regarded as illustrative rather than limiting, and that it be understood that it is the following claims, including all equivalents, that are intended to define the spirit and scope of this invention.

C. Modifications

The present invention is not limited to the embodiments described above, and may be modified within the scope of the invention. For example, the following modifications are possible.

Modification 1

In the above described embodiment, description is given of a case where it is determined that upgrade of a Java APP can be completed only if a value, indicating a radio field intensity transmitted from a base station, 21 is larger than a predetermined threshold value. However, the information is not limited to a value indicating a radio field intensity, and the information can be used as a basis for control unit 410 of the communication terminal device 10 to determine whether the upgrade of a Java APP can be completed. For example, it is possible to use the remaining battery power of a battery built into the communication terminal device 10. The reason for determining whether to start an upgrade based on the remaining battery power is as stated below.

Generally, a communication terminal device such as a mobile phone provides operational power from a built-in battery. Therefore, if upgrade of a Java APP is started with insufficient remaining battery power, power will be lost before the upgrade is completed, thus preventing the upgrade from being completed. Thus, if an amount of power remaining in a battery is checked before starting an upgrade, upgrade failure can be prevented.

Modification 2

In the above-described embodiment, description is given for a case where the present invention is performed relative to a mobile phone having a Java Runtime environment. However, the present invention is not limited to being applied to mobile phones. For example, the present invention can also be applied to a PDA or PHS (Personal Handyphone System®) terminal provided with a Java Runtime environment, and also to a PC having a Java Runtime environment such as PCA 70A-70C comprising a LAN 60 connected to the Internet 30 via a GW device 50, as shown in FIG. 9. In short, any device is possible as long as it is a computer device provided with a Java Runtime environment, and having a function for executing Java APPs in accordance with JAM and communicating with a content server 40 via a communications network.

In the case of upgrading a Java APP being operated in PC 70A-70C shown in FIG. 9, the determination is not necessary, the determination for whether upgrade of the Java APP can be completed (FIG. 8: step SB2), or whether the download is completed successfully (FIG. 8: step SB5). This is because PC 70A-70C shown in FIG. 9 are connected to the Internet 30 via a LAN 60 by a fixed wire, which means that communication with the content sever 40 is always possible, and upgrade of the Java APP can be completed reliably.

Modification 3

In the above-described embodiment, description is given for a case where an application program written in Java is stored in the communication terminal device 10. However, the programming language for writing the application program is not limited to Java. For example, it is also possible to have an application program written in C++. In this case, in place of JAM, software for managing the application program must be stored in the communication terminal device storing the application program.

Modification 4

In the above-described embodiment, the description is given about the case where software, for upgrading an executed Java APP, is pre-stored in the communication terminal device 10. However, it is also possible to provide the same functions as the communication terminal device of the present invention to a computer device by storing in the computer device, software performing the functions of the communication terminal device of the present invention.

Specifically, it is possible to provide the same functions as those of the terminal device to a computer device by installing general software for a computer device in the computer device by using a computer-readable recording medium which records the above software.

The invention claimed is:

1. A communication terminal device comprising:
   a communication unit configured to communicate with a provider of an application program via a communication network;
   an execution unit configured to execute an application program, wherein the application program includes a specified command;
   a suspend unit configured to suspend execution of the application program in response to execution of the specified command; and
   an upgrade unit configured to upgrade the application program, by communication via the communication unit with the provider, in response to suspension of the application program.

2. The communication terminal device of claim 1, wherein the execution unit is configured to resume execution of the application program after the upgrade unit completes an upgrade of the application program.

3. The communication terminal device of claim 1, further comprising:
   the upgrade unit further configured to determine whether an upgrade of the application program can be completed;
   the execution unit further configured to resume execution of the application program without the upgrade in response to determination that the upgrade of the application program cannot be completed;
   the upgrade unit further configured to upgrade the application program in response to determination that the upgrade of the application program can be completed; and
   the execution unit further configured to resume execution of the application program in response to completion of the upgrade of the application program, wherein the application program further includes the upgrade.

4. The communication terminal device of claim 3, further comprising:
   a detection unit configured to detect an event that indicates the upgrade of the application program should be terminated;
   the upgrade unit is further configured to terminate the upgrade of the application program in response to detection of the event; and
   the execution unit further configured to resume execution of the application program without the upgrade in response to termination of the upgrade of the application program.

5. A computer readable storage medium storing a program for causing a computer device to execute a process, the process comprising:
   communicating with a provider of an application program via a communication network;
   executing an application program, wherein the application program includes a specified command;
   suspending execution of the application program in response to execution of the specified command; and
   upgrading the application program through communications with the provider in response to suspension of execution of the application program.

6. A communication terminal comprising:
   a processor communication with a memory, wherein the memory includes an application program, wherein the application program comprises an update command;
   a communication unit coupled to the processor, the communication unit configured to communicate with an application provider; and the processor configured to execute the application program, wherein the processor subsequently executes the update command, and the processor is further configured to suspend the application program and to download an update for the application program from the application provider in response to execution of the update command.

7. The communication terminal of claim 6, wherein the processor is further configured to detect a completed download of the update for the application program, and in response to detection of the completed download of the update for the application program, the processor is further configured to resume execution of the application program, wherein the application program includes the update.

8. The communication terminal device of claim 6, further comprising:
the processor further configured to set a state of a completion condition, the state comprising at least one of a download success state and a download incomplete state, wherein the processor is further configured to set the completion condition to the download success state in response to a successful download of the update for the application program, and wherein the processor is further configured to set the completion condition to the download incomplete state in response to an unsuccessfull download of the update for the application program;
the processor further configured to detect the completion condition set to the download incomplete state, and the processor further configured to resume execution of the application program without the update for the application program in response to detection of the completion condition set to the download incomplete state; and
the processor further configured to detect the completion condition set to the download complete state, and in response, to resume execution of the application program, wherein the application program further includes the update for the application program.

9. The communication terminal according to claim 6, further comprising:
the processor further configured to set a state of a completion condition, the state comprising at least one of a download success state and a download incomplete state, wherein the processor is further configured to set the completion condition to the download success state in response to a successful download of the update for the application program, and wherein the processor is further configured to set the completion condition to the download incomplete state in response to an unsuccessful download of the update for the application program;
the processor further configured to detect an upgrade failure event and the completion condition set to the download incomplete state, and in response to detection of both the upgrade failure event and the download incomplete state, the processor further configured to terminate the download of the update for the application program; and
the processor further configured to resume execution of the application program without the upgrade for the application program in response to the upgrade failure event.

10. The communication terminal according to claim 9, wherein the processor is further configured to detect the upgrade failure event and the completion condition set to the download success state, and the processor is further configure to resume execution of the application program in response to detection of both the upgrade failure event and download success state, wherein the application program further includes the update for the application program.

11. A method to automatically update a program comprising:
a mobile terminal executing an application program comprising instructions, wherein the instructions include an update invoke instruction;
the mobile terminal executing the update invoke instruction;
the mobile terminal determining an availability of an update for the application program from an application program provider in response to execution of the update invoke instruction;
the mobile terminal suspending execution of the application program in response to determination that the update for the application program is available;
the mobile terminal downloading the update for the application program in response to determination that the update for the application program is available;
the mobile terminal detecting a download completion for the update for the application program; and
the mobile terminal resuming execution of the application program in response to detection of the download completion, wherein the application program includes the update for the application program.

12. The method of claim 11, wherein the mobile terminal determining the availability of the update for the application program further comprises:
the mobile terminal acquiring specified time-date data for the application program in response to commencement of execution of the application program;
the mobile terminal acquiring a current date data;
the mobile terminal comparing the specified time-date data to the current date data; and
the mobile terminal determining that the update for the application program is available in response to comparison of the specified time-date data to the current date data.

13. The method of claim 11, wherein the mobile terminal determining the availability of the update for the application program further comprises:
the mobile terminal acquiring specified time-date data for the application program in response to commencement of execution of the application program;
the mobile terminal acquiring a current date data;
the mobile temrinal determining that the update for the application program is unavailable in response to comparison of the specified time-date data to the current date data; and
the mobile terminal continuing execution of the application program without the update in response to determination that the update for the application program is unavailable.

14. The method of claim 11, wherein the mobile terminal determining the availability of the update for the application program further comprises:
the mobile terminal receiving an update message from at least one of the application program provider or a content provider; and
wherein the mobile terminal generating the update available indication in response to determination that the update for the application program is available further includes generating the update available indication in response to receipt of the update message.

15. The method of claim 11, wherein the mobile terminal is in communication with the application provider via a wireless communication network, the method further comprising:
the mobile terminal detecting a radio field intensity associated with the wireless communication network;

the mobile terminal comparing the radio field intensity to an intensity threshold;

wherein determining the availability of the update of the application program further comprises:

the mobile terminal generating an update unavailable indication in response to the radio field intensity being less than the intensity threshold; and the mobile terminal continuing execution of the application program without the update in response to the update unavailable indication.

16. The method of claim 11, wherein the mobile terminal includes a battery, and wherein the mobile terminal downloading the update for the application program further comprises:

the mobile terminal detecting that a charge on the battery is insufficient to complete a download of the update for the application program;

the mobile terminal generating an update unavailable indication in response to detection that the charge on the battery is insufficient to complete the download of the update for the application program.

17. A computer-readable recording media for storing instructions, which when executed, cause the processor to perform a process comprising:

execution of an application program, wherein the application program includes an update instruction;

determination that an update for the application program is available in response to execution of the update instruction;

suspension of execution of the application program in response to determination that the update for the application program is available;

download of the update for the application program in response to determination that the update for the application program is available;

detection of a download completion of the update for the application program; and resumption of execution of the application program in response to detection of the download completion, wherein the application program includes the update for the application program.

18. The computer-readable recording media of claim 17, wherein the determination that the update for the application program is available further comprises:

acquisition of specified time-date data associated with the update for the application program in response to commencement of execution of the application program;

acquisition of a current date data;

comparison of the specified time-date data to the current dtae data; and determination that the update for the application program is available in response to comparison of the specified time-date data to the current date data.

19. The computer-readable recording media of claim 17, wherein determination that the update for the application program is available further comprises:

acquisition of the specified time-date data associated with the update for the application program in response to commencement of the application program;

determination that the update for the application program is unavailable in response to comparison of the specified time-date data to the current date data; and continuation execution of the application program without the update in response to determination that the update for the application program is unavailable.

20. The computer-readable recording media of claim 17, wherein determination that the update for the application program is available further comprises:

receipt of an update message from at least one of an application program provider or a content provider; and generation of an update available indication in response to receipt of the update message.

21. A communication terminal comprising:

a communication unit in communication with an application provider;

a processor in communication with the communication unit;

a memory in communication with the processor, wherein the memory comprises executable program code for an application program, wherein the application program includes a specified command;

the processor is further configured to execute the application program;

wherein the processor is configured to suspend execution of the application program and download an update for the application program from the application provider in response to execution of the specified command; and the processor is further configured to generate an update condition, wherein the update condition comprises an update completed state or an update failed state, and wherein the processor is further configured to resume execution of the application program without the update based on generation of the update failed state, and the processor is configured to resume execution of the application program with the update based on generation of the update completed state.

22. The communication terminal of claim 21, wherein the update condition further comprises an update abort state, wherein the processor is further configured to detect a stop update event and in response to the stop update event the processor is further configured to abort the update of the application program.

* * * * *

UNITED STATES PATENT AND TRADEMARK OFFICE
CERTIFICATE OF CORRECTION

PATENT NO. : 7,401,127 B2
APPLICATION NO. : 10/811060
DATED : July 15, 2008
INVENTOR(S) : Masayuki Tsuda et al.

It is certified that error appears in the above-identified patent and that said Letters Patent is hereby corrected as shown below:

Column 13
Line 43, delete the word "the" after --wherein--.
Line 50, delete "dtae" and insert --date--.

Column 14
Line 10, insert --of-- after --continuation--.

Signed and Sealed this

Fourth Day of November, 2008

JON W. DUDAS
*Director of the United States Patent and Trademark Office*